(No Model.)
C. N. DUTTON.
Valve Apparatus.
No. 240,982. Patented May 3, 1881.
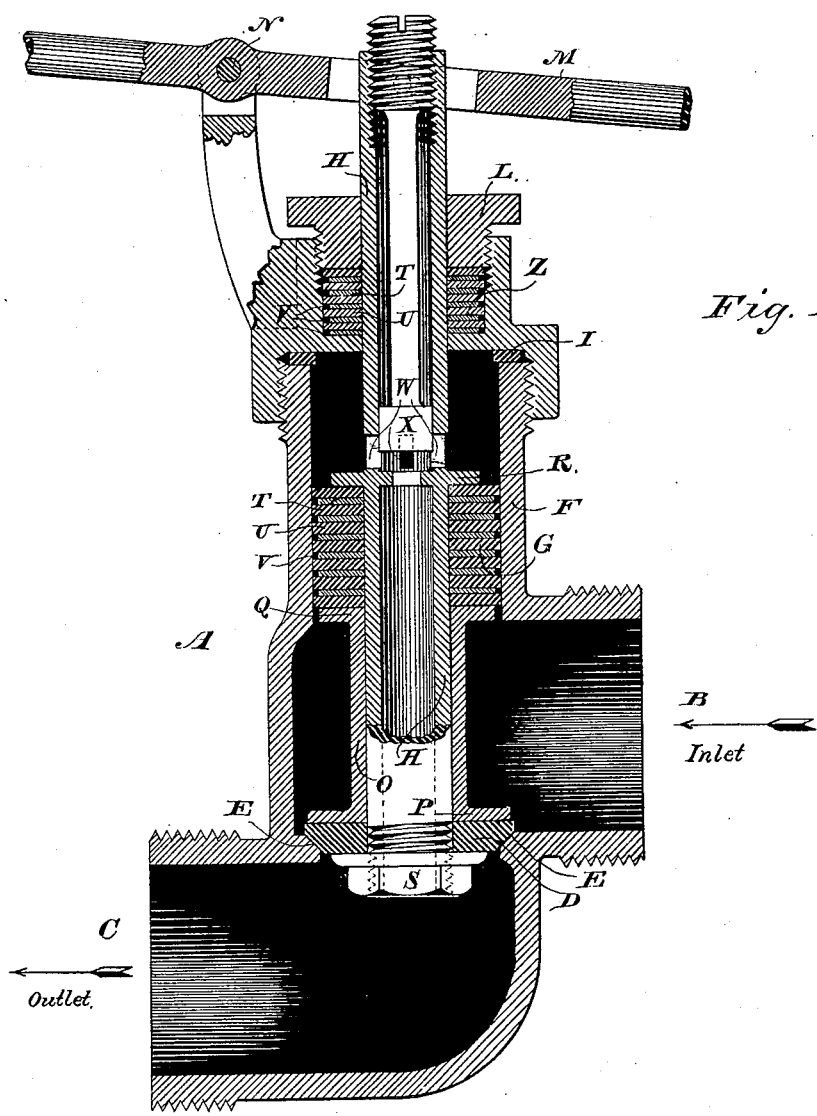
WITNESSES
Wm A. Skinkle,
Chas. H. Baker.
INVENTOR
Chauncey N. Dutton.
By his Attorneys
Baldwin, Hopkins, & Peyton.
N. PETERS, Photo-Lithographer, Washington, D. C.

UNITED STATES PATENT OFFICE.

CHAUNCEY N. DUTTON, OF WASHINGTON, DISTRICT OF COLUMBIA, ASSIGNOR OF ONE-HALF TO THOMAS WILSON, OF SAME PLACE.

VALVE APPARATUS.

SPECIFICATION forming part of Letters Patent No. 240,982, dated May 3, 1881.

Application filed August 16, 1880. (No model.)

*To all whom it may concern:*

Be it known that I, CHAUNCEY N. DUTTON, of Washington, in the District of Columbia, have invented certain new and useful Improvements in Valve Apparatus, of which the following is a specification.

In the accompanying drawings, illustrating an embodiment of my invention suitable for an ordinary water-closet, Figure 1 is an elevation partly in section, and Fig. 2 is a plan of the valve-operating lever and valve-rod detached.

The drawings illustrate, and I therefore proceed to describe, a complete working valve; but my improvements are limited to the combination of parts forming the valve-piston and to the celluloid valve-body.

In Fig. 1, A indicates the valve-body, with an inlet, B, and an outlet, C, between which is the valve D and its seat E, of usual form and function.

F indicates a cylinder, in which works a piston, G, secured to the tubular valve-rod H. This cylinder is closed at its outer end by a screw-cap, which clamps a suitable packing-ring, I, between itself and the cylinder end. Within this screw-cap is a packing, Z, clamped in place by the screw nut or gland L.

M indicates the valve-rod lever, having its fulcrum at N.

From this general outline it will be perceived how the valve D and the piston G are to be operated in connection with the valve-rod by means of the lever M.

Referring, now, to my device more in detail, O indicates a sleeve, provided with flanges P and Q, which surrounds the lower end of the tubular valve-rod. This rod is provided with an annular projection, R, between which and the flange Q is secured the piston G. The valve D being placed in position upon its rod beneath the flange P, the sleeve-nut S is then screwed up tightly, which causes the clamping of the valve between itself and the flange P, and also the clamping of the piston between the flange Q and the annular projection R. I form the piston of alternate flat rings of packing metal, T, or other substance having strong attraction for water, and of celluloid, U, or other substance having no attraction for water, the latter being of a diameter to nicely fit the interior of the cylinder F, and the former being of smaller diameter, so that there are left annular spaces V between the two series of rings, in which water is retained by the attraction of the metal and the repulsion of the celluloid. This water serves as a water-packing and lubricant for the piston.

The piston or valve rod, which, being hollow, opens into the outlet below, is provided with one or more transverse apertures, W, forming a passage or passages from the cylinder F into the interior of the rod. The object of this construction is to permit the ingress of air into the cylinder from the outlet, and the egress of air or water therefrom into the outlet, should any water happen to pass the piston and escape into the cylinder.

In order to regulate the size of the aperture or apertures W, I provide a plunger, X, which is screwed into the top of the valve-rod, and may be adjusted up or down at pleasure, so as to enlarge or diminish the openings W.

The packing Z is composed of alternate flat rings, like the piston, and the annular spaces may be filled with water. I propose to make the valve body or shell A of celluloid, molded around mandrels or formers under pressure, and then hardened, and afterward properly screw-threaded. Of course, however, it may be cast of metal and finished up in the usual manner.

A valve-body formed of celluloid has several important practical advantages over any other valve-body with which I am familiar.

First, it is light, strong, durable, and cheap.

Second, it is practicable to form it by molding, when it is in a plastic state, into the irregular and difficult shapes of valve-bodies, and while it is being formed in the manner above stated, it does not require to be heated to such a degree as to prevent handling, and after it is formed at a moderate temperature it does not contract in cooling, so as to be liable to distort its shape.

Third, after it is perfectly formed in the manner above stated, it does not require to be baked or otherwise treated to harden it.

Fourth, its capacity for such wear as is incident to valve-bodies greatly exceeds that of brass, which is the usual metal employed for manufacturing valve-bodies.

Fifth, celluloid is water-repellent, which is a great advantage in its use for the manufacture of valve-bodies. Brass and other materials commonly used for valve-bodies attract water, or permit it to flow and spread freely over their surfaces, and consequently it is difficult to make water-tight joints with them. Such joints can readily be made in valve-bodies composed of celluloid, because of the fact that it is water-repellent, and by this quality it aids in preventing the escape of water.

Sixth, celluloid is not liable, like metals, to corrode when in contact with water.

Seventh, valves composed in any of their parts or connections of different metals, or of metals in combination with hard rubber, are liable to a species of corrosion by galvanic action. Celluloid, being entirely a vegetable product, is free from this danger.

It will be observed that the diameter of the valve is greater than that of the piston. The result is that the pressure of water or other fluid from the inlet will tend to bring the valve down into its seat and hold it there. Were it not for the tubular valve-rod and its apertures W, or some equivalent provision, this pressure would cause the sudden closing of the valve, and its hammering in its seat and injurious wear; but in my device nothing of that sort can occur, because when the valve is raised from its seat the air or water in the cylinder above the piston will be expelled through the aperture or apertures W, and as the piston tends to descend under the differential pressure of the water from the inlet upon the valve, a partial vacuum will be formed in the cylinder above the piston, and its descent checked until air or water can gradually enter through the tubular rod and apertures W. Thus the valve will close slowly and permit a flow of water in a water-closet, for instance, after the pull-rod has been released by the hand.

It is obvious that in the application of my invention the relations of the parts may be changed—that is to say, the outlet may be made the inlet, and vice versa; but in that case the diameters of the valve and piston would have to be changed accordingly.

Having thus described the construction and mode of operation of my improvements, what I claim as new, and desire to secure by Letters Patent, is—

1. A celluloid valve-body formed by molding upon mandrels or formers and then hardening and finishing, substantially as described.

2. The piston G, composed of alternate layers of metal and celluloid of different diameters, which respectively attract and repel water, so as to leave annular spaces V, substantially as described.

CHAUNCEY N. DUTTON.

Witnesses:
MARCUS S. HOPKINS,
JAMES YOUNG.